United States Patent [19]
Inoue et al.
[11] Patent Number: 4,910,258
[45] Date of Patent: Mar. 20, 1990

[54] METHOD OF PRODUCING GRAFT POLYMERIZED SOFT FLUORORESIN

[75] Inventors: Shuichi Inoue; Satoru Hayase, both of Kamifukuoka, Japan

[73] Assignee: Central Glass Company, Limited, Ube City, Japan

[21] Appl. No.: 227,613

[22] Filed: Aug. 3, 1988

[30] Foreign Application Priority Data

Aug. 10, 1987 [JP] Japan ................ 62-198118

[51] Int. Cl.4 ................ C08F 259/08

[52] U.S. Cl. ................ 525/244; 525/246; 525/247; 525/276

[58] Field of Search ................ 525/276, 244, 246, 247

[56] References Cited

U.S. PATENT DOCUMENTS

| | | | |
|---|---|---|---|
| 3,929,934 | 12/1975 | Moore | 525/276 |
| 4,141,874 | 2/1979 | Oka | 525/276 |
| 4,155,953 | 5/1979 | Tatemoto | 525/276 |
| 4,472,557 | 9/1985 | Kawashima et al. | 525/276 |
| 4,652,592 | 3/1987 | Kawashima | 525/281 |
| 4,655,963 | 4/1987 | Koga | 525/276 |

FOREIGN PATENT DOCUMENTS

| | | | |
|---|---|---|---|
| 206615 | 12/1983 | Japan | 525/276 |
| 195035 | 8/1987 | Japan . | |

*Primary Examiner*—John C. Bleutge
*Assistant Examiner*—David Buttner
*Attorney, Agent, or Firm*—Fleit, Jacobson, Cohn, Price, Holman & Stern

[57] ABSTRACT

The disclosure relates to a graft polymerization method to form a fluorine-containing graft copolymer which is useful as a soft and flexible fluororesin intermediate between fluororubbers and crystalline fluororesins. The graft copolymer is formed by polymerizing a fluorine-containing crystalline polymer, e.g. copolymer of CTFE and ethylene, in water in the presence of a reducing agent and a fluorine-containing elastomeric copolymer which comprises peroxy groups and is dispersed in the water to become the "trunk" of the graft copolymer. For example, the elastomeric copolymer is of vinylidene fluoride, CTFE and t-butyl peroxyallylcarbonate. An example of the reducing agent is sodium bisulfite, and optionally and additionally a source of a reducing metal ion such as ferric chloride may be used. This graft polymerization reaction can be carried out at a relatively low temperature, viz. at 20°-50° C., and the grafted crystalline polymer becomes sufficiently high in the degree of polymerization and in crystallinity.

11 Claims, No Drawings

METHOD OF PRODUCING GRAFT POLYMERIZED SOFT FLUORORESIN

BACKGROUND OF THE INVENTION

This invention relates to an improved method of producing a soft fluororesin which is a graft copolymer comprised of an elastomeric fluorine-containing copolymer and a grafted crystalline fluoro-polymer.

Various fluororesins using crystalline polymers or copolymers are widely used by reason of their characteristic properties attributed to C-F bond, such as good heat resistance, high resistance to oils and many other chemicals and excellent weatherability. However, crystalline fluororesins are generally poor in flexibility or pliability, and therefore applications of such fluororesins are limited or rather unsuitable where flexibility is a matter of importance as in the cases of hoses, gaskets, seals and general-purpose sheets.

Where good flexibility is required besides the favorable properties of fluororesins it is usual to use fluororubbers. However, use of fluororubbers entails complicated operations because molding of a fluororubber needs to be preceded by kneading of a mixture of a raw fluororubber and additives such as stabilizers, fillers and cross-linking agents and needs to be followed by a cross-linking treatment at a controlled temperature. For the same reason there are limitations on the shapes of articles or parts to be formed of fluororubbers. In some cases it offers another problem that cross-linked fluororubbers can hardly be reworked.

U.S. Pat. No. 4,472,557 discloses fluorine-containing graft copolymers which can be regarded as intermediate between crystalline fluororesins and fluororubbers and have both the merits of crystalline fluororesins and the merits of fluororubbers. The graft copolymers are melt-processable and are soft and flexible. In a graft copolymer of this category the "trunk" polymer segment is a fluorine-containing elastomeric copolymer, and the "branch" segments are of a fluorine-containing crystalline polymer which may be a copolymer. In first preparing the elastomeric copolymer a peroxide of an unsaturated organic compound is used as a comonomer to introduce peroxy groups into the copolymer, and graft polymerization of the crystalline polymer segments is accomplished by utilizing thermal decomposition of the peroxy groups in the "trunk" polymer. In the obtained graft copolymer the grafted crystalline polymer segments act as a sort of physical cross-linking points at temperatures below the melting point of the crystalline polymer, so that the graft copolymer exhibits physical properties resembling the properties of a chemically cross-linked elastomer.

In a fluorine-containing graft copolymer of the above described type using a given combustion of an elastomeric copolymer and a crystalline polymer, the structure of the grafted crystalline polymer greatly affects the mechanical and thermal properties of the graft copolymer and also the degree of fluidity of the melted graft copolymer. In general, for obtaining a graft copolymer of this type excellent in both mechanical properties and thermal properties it is necessary that the grafted crystalline polymer is sufficiently high in the degree of polymerization and is high in crystallinity.

However, it is accepted that in graft polymerization of a crystalline polymer the growth of the polymer crystals is often obstructed by some factors so that the polymer does not fully exhibit its inherent crystallinity.

This tendency becomes pronounced when the graft polymerization is carried out at a relatively high temperature. In producing the above described fluorine-containing graft copolymers it is usual to use t-butyl peroxyallylcarbonate to introduce peroxy groups into the "trunk" polymer. When this peroxide is used the subsequent graft polymerization reaction has to be carried out at about 100° C., which is a considerably high temperature unfavorable for crystallinity of the grafted polymer.

It is conceivable to use a different peroxide which permits to carry out the graft polymerization reaction at a lower temperature to thereby increase the degree of polymerization of the crystalline polymer and reduce the amount of imperfect structure which is obstructive to good crystallinity of the polymer. Actually, however, it is difficult to use a peroxide which undergoes thermal decomposition at a sufficiently low temperature for the graft polymerization reaction. Since the peroxide is used as a comonomer in preparing the elastomeric copolymer as the "trunk" polymer, it is necessary to use a polymerization initiator which is active at a temperature lower than the thermal decomposition temperature of the peroxide in order to introduce undecomposed peroxy groups into the copolymer. Although such a low temperature active initiator may be embodied in a fluorinated compound such as heptafluorobutylic peroxide, such a compound is very inconvenient as an industrial material for several reasons including very limited supply of the starting fluorocarboxylic acid. It is also difficult to find an unsaturated peroxide which is available as an industrial material, is stably copolymerizable and, at the subsequent graft polymerization reaction, is active at a fairly low temperature. In the current practice, t-butyl peroxyallylcarbonate is almost the sole peroxide useful in producing the above described fluorine-containing graft copolymers. In conclusion it is unrealistic to select an unsaturated peroxide which decomposes at a very much lower temperature than t-butylperoxy allylcarbonate does.

U.S. Pat. No. 4,472,557 shows using 1,1,2-trifluoro-1,2,2-trichloroethylene as the liquid medium for the graft polymerization reaction. In our view, the use of such a solvent is also responsible for the difficulty of grafting a crystalline polymer which is sufficiently high in the degree of polymerization and in crystallinity. That is, the graft polymerization reaction, which is carried out at a relatively high temperature as mentioned above, is liable to be disturbed by chain transfer from the growing polymer into the solvent. The resultant insufficiency of the degree of polymerization is particularly significant when the crystalline polymer is polychlorotrifluoroethylene or a chlorotrifluoroethylene base copolymer, and in such a case the melting point of the obtained graft copolymer is far lower than an expected level.

SUMMARY OF THE INVENTION

The present invention is concerned with producing fluorine-containing graft copolymers of the above described type and has an object of enhancing the degree of polymerization and crystallinity of the grafted crystalline polymer.

The present invention provides a method of producing a fluorine-containing graft copolymer by polymerizing at least one monomer, which comprises at least one fluorine-containing monomer and provides a crystalline polymer, in a liquid medium in the presence of a fluorine-containing elastomeric copolymer which comprises peroxy groups and has a glass transition temperature lower than room temperature, the method being characterized in that water is used as the liquid medium for dispersing therein the elastomeric copolymer and that the polymerization of said at least one monomer is carried out in the presence of at least one reducing agent in the water.

We have found that the desired graft polymerization can efficiently be accomplished as a sort of redox polymerization by dispersing the elastomeric copolymer employed as the "trunk" polymer in water and by using a reducing agent of use in ordinary redox polymerization reactions. By this method the graft polymerization can be carried out at a relatively low temperature, and the degree of polymerization and crystallinity of the grafted crystalline polymer can be enhanced. For example, an alkali metal sulfite or persulfate serves as a good reducing agent. In addition to such a reducing agent, a source of a metal ion active as a reducing agent such as ferric ion may be used for further enhancing the efficiency and regularity of graft polymerization of the crystalline polymer.

In preparation for the graft polymerization reaction it suffices to disperse a powder of the selected elastomeric copolymer in water by an ordinary agitation means and adding the reducing agent to the water at a convenient stage. As an alternative or, rather, more advantageous method it is possible to use an aqueous dispersion of the elastomeric copolymer obtained at the stage of forming that copolymer. An elastomeric copolymer suitable for use in this invention is formed by radical polymerization reaction in water, and usually the copolymer is obtained in the form of an aqueous latex. The graft polymerization reaction according to the invention can be carried out in this latex, and by doing so the operations for separating the elastomeric copolymer from the latex and again dispensing it in water can be omitted. Furthermore, it becomes practicable to employ, as the "trunk" polymer, a copolymer very high in elastomericity because there is no need of giving consideration to the difficulty of separating and handling a fine powder of such a copolymer, and therefore it becomes possible to obtain a very soft graft copolymer.

DESCRIPTION OF THE PREFERRED EMBODIMENTS

In this invention the "trunk" polymer of the aimed graft copolymer is an elastomeric copolymer having C-F bonds and peroxy groups. More particularly the "trunk" polymer is a copolymer of at least two kinds of principal monomers including at least one fluorinated monomer and an additional unsaturated compound which has peroxy bond (such a compound will be called an unsaturated peroxide). The copolymerization reaction to form the "trunk" polymer is carried out by using a radical initiator at a temperature at which the epoxy group in the unsaturated peroxide hardly decomposes. Since good elastomericity is an indispensable requisite to the "trunk" polymer in this invention, the copolymer is formed so as to have a glass transition temperature, $T_g$, lower than room temperature. The basic monomers for the copolymer can be selected from various combinations employed or proposed for known elastomeric fluororesins or fluororubbers. Either a combination of fluorinated compounds or a combination of at least one fluorinated compound and at least one unsubstituted hydrogen compound may be employed.

For example, the "trunk" polymer is a copolymer of vinylidene fluoride (VDF), chlorotrifluoroethylene (CTFE) and an unsaturated peroxide, a copolymer of VDF, hexafluoropropylene (HFP) and an unsaturated peroxide, a copolymer of VDF, HFP, tetrafluoroethylene (TFE) and an unsaturated peroxide, a copolymer of TFE, propylene and an unsaturated peroxide, or a copolymer of TFE, perfluorovinyl ether and an unsaturated peroxide. A particularly favorable example of unsaturated peroxides is t-butyl peroxyallylcarbonate. The amount of the unsaturated peroxide is controlled such that the obtained copolymer contains 0.02 to 0.2 wt % of peroxy groups.

In a graft copolymer which is produced by this invention for use as a soft and flexible fluororesin, the "branch" component is a fluorine-containing crystalline polymer which may be a copolymer. It is suitable to employ a crystalline polymer whose melting temperature is not lower than 130° C. For example, the crystalline polymer may be polytetrafluoroethylene, polychlorotrifluoroethylene, polyvinylidene fluoride, polyvinyl fluoride, copolymer of CTFE and ethylene, copolymer of TFE and ethylene or copolymer of TFE and perfluorovinyl ether. In general it is suitable to accomplish the graft polymerization such that in the obtained graft copolymer the proportion of the elastomeric "branch" polymer to the crystalline "branch" polymer falls in the range from 50:50 to 99:1, and preferably from 50:50 to 90:10, by weight.

According to the invention, grafting of a crystalline polymer to the elastomeric "trunk" polymer is accomplished by polymerizing the monomer(s) of the desired crystalline polymer in an aqueous dispersion of the "trunk" polymer in the presence of a reducing agent. For good dispersion, the "trunk" polymer needs to be in a finely divided form. The particles of the polymer may be coarser than usual powder particles, but even in such a case the polymer particles should be smaller than 2 mm in diameter or maximum length.

In dispersing a powder of the "trunk" polymer in water by a suitable stirring method it is optional to add a surfactant, a suspending agent such as polyvinyl alcohol or carboxymethyl cellulose and/or a surface tension reducing liquid such as t-butanol. An ordinary hydrocarbon base surfactant can be used, but in most cases it is better to use a fluorine-containing surfactant represented by ammonium perfluorooctanoate with a view to reducing thermal coloration of the obtained graft copolymer during post-polymerization treatments and subsequent shaping operations.

The operation of dispersing the "trunk" polymer in water can be omitted by maintaining this polymer in the state as formed. The radical polymerization to form an elastomeric copolymer useful as the "trunk" polymer is carried out in water, and the reaction product is in the form of an aqueous latex in which the copolymer is uniformly dispersed. This latex can be used as the aqueous medium for the graft polymerization reaction according to the invention. If necessary the latex may be suitably diluted with water. Using the latex of the elastomeric copolymer in this manner there is no need of separating the copolymer from the aqueous phase. This is very favorable for industrial practice since troublesome operations are needed to precipitate and collect the elastomeric copolymer contained in the latex. Furthermore, it become practicable to use a "trunk" polymer very high in elastomericity to thereby obtain a very soft and flexible graft copolymer since difficulty of isolating or handling such a "trunk" polymer is no longer a matter for consideration. For example, it becomes fully practicable to use a copolymer of CTFE and ethylene at any desired copolymerization ratio as the "trunk" polymer.

Most of the reducing agents used in conventional redox polymerization processes are useful in the present invention. For example, it is suitable to use an alkali metal sulfite, bisulfite, persulfate or thiosulfate such as sodium sulfite, sodium bisulfite, sodium persulfate or sodium thiosulfate. In addition to such a reducing agent, a source of a reducing metal ion may be used to enhance the efficiency of polymerization in both the degree of polymerization and regularity of the chain structure of the polymer grafted to the "trunk" polymer. For example, a metal salt such as ferric chloride, cobalt chloride or copper chloride is suitable as the source of reducing metal ions. The total amount of the reducing agent is adjusted on the basis of the content of the peroxy group in the "trunk" polymer present in the graft polymerization system. Usually the amount of the reducing agent is from half to tenfold of the amount of the peroxy group.

The graft polymerization reaction for grafting a crystalline polymer to the elastomeric "trunk" polymer is carried out in an autoclave type reactor at a relatively low temperature ranging from 20° to 50°°C.

The invention is further illustrated by the following nonlimitative examples.

EXAMPLE 1

Initially a 2-liter stainless steel autoclave was charged with 1000 g of purified water, 2 g of potassium persulfate, 3 g of ammonium perfluorooctanoate and 2 g of t-butyl peroxyallylcarbonate (abbreviated to BPAC). After repeatedly purging the gas atmosphere and replacing it by nitrogen gas, 250 g of VDF monomer and 151 g of CTFE monomer were charged into the autoclave, and the resultant mixture was subjected to copolymerization reaction at 50° C. for 20 hr with continuous stirring. The reaction product was in the state of a white latex, from which a rubber-like powder was obtained by salting-out treatment. The powder was washed with water, dried in vacuum, then washed with n-hexane to completely remove unreacted residue of BPAC and again dried in vacuum. The dried powder weighed 320 g. This powder was of an elastomeric copolymer of VDF, CTFE and BPAC. Thermal analysis of this copolymer with a differential scanning calorimeter (DSC) revealed the existence of an exothermic peak at 160°-180° C., which was attributed to decomposition of peroxy group. By DSC analysis at low temperatures, $T_g$ of the copolymer was determined to be −21° C. By iodometric titration the content of active oxygen in the copolymer was measured to be 0.042%.

Grafting of a copolymer of CTFE and ethylene to the rubber-like VDF/CTFE/BPAC copolymer was accomplished in the following manner.

First 72 g of the rubber-like copolymer was dispersed in a solution of 2.5 g of ammonium perfluorooctanoate in 500 g of purified water, and the aqueous dispersion was charged into a 1-liter autoclave provided with electomagnetic stirrer, and 0.9 g of $NaHSO_3$ was added as a reducing agent. Repeatedly the gas atmosphere in the autoclave was purged and replaced by nitrogen gas. After that 76.9 g of CTFE monomer and 18.5 g of ethylene monomer were introduced into the autoclave, and the resultant mixture was subjected to copolymerization reaction at 30° C. for 20 hr with continuous stirring. After purging unreacted portions of the monomers, a copolymer formed by the reaction was separated from the aqueous solution, washed and dried. The obtained graft copolymer was in the form of a white powder, which weighed 155 g. By DSC analysis the melting temperature of this graft copolymer was 230° C.

The graft copolymer was kneaded at 220° C. with a pair of 4-inch rolls and then press-shaped at 250° C. into a sheet having a thickness of 1 mm. The obtained sheet assumed a milky white color and was flexible. The resin sheet was subjected to the following tests. The results are tabled hereinafter together with the results of the same tests on the fluororesins of the subsequent examples and comparative examples.

Tensile Test

Tensile strength at break and elongation at break were measured at 23° C. by a standard method according to JIS K 6301 using tensile specimens of the dumbbell shape No. 3. The tension rate was constantly 200 mm/min.

Dynamic Visoelasticity Test

Shear modulus was measured with a viscoelasticity tester of the torsion pendulum type using test pieces 10 mm in width, 80 mm in length and 1 mm in thickness. The measurement was made at 0° C., at 30° C. and at 60° C.

Hardness Test

Shore D scale hardness was measured at 23° C. by the method according to ASTM D 2240 on test pieces 40 mm×80 mm wide and 3.2 mm thick.

COMPARATIVE EXAMPLE 1

First 72 g of the VDF/CTFE/BPAC copolymer prepared in Example 1 was dispersed in 500 ml of 1,1,2-trifluoro-1,2,2-trichloroethylene (hereinafter referred to as R-113), and the dispersion was charged into a 1-liter autoclave provided with electromagnetic stirrer. After repeatedly purging the gas atmosphere and replacing it by nitrogen gas, 75.7 g of CTFE monomer and 18.0 g of ethylene monomer were introduced into the autoclave, and the resultant mixture was subjected to graft copolymerization reaction at 98° C. for 24 hr with continuous stirring. That is, no reducing agent was used in the graft copolymerization reaction. After purging unreacted portions of the monomers, a graft copolymer formed by the reaction was separated from the organic solvent and was washed and dried. The dried graft copolymer was in the form of a white powder, which weighed 101.2 g.

By DSC analysis the melting temperature of this copolymer was 175° C. This was far lower than the melting temperature (230° C.) of the graft copolymer of Example 1, and in this case the exothermic peak was very much broader than that in Example 1. This copolymer was kneaded (at 180° C.) by the same method as in Example 1 and press-shaped (at 200° C.) into a 1-mm thick sheet, and the copolymer in the sheet form was subjected to the above described tests. As can be seen in the Table, compared with the graft copolymer of Example 1 this copolymer was very much lower in tensile strength and elongation at break and was lower in shear mudulus too.

COMPARATIVE EXAMPLE 2

The initial copolymerization reaction of Example 1 was modified only by omitting the use of BPAC and slightly increasing the quantities of VDF and CTFE monomers. As the result 360 g of a rubber-like VDF/CTFE copolymer was obtained. Next, 40 g of the VDF/CTFE copolymer was blended with 40 g of an ethylene/CTFE copolymer in the form of pellets (Halar #920 supplied from Ausimont Co.) by kneading with a pair of 4-inch rolls at 230° C. The obtained polymer blend was press-shaped at 250° C. into a 1-mm thick sheet and was subjected to the above described tests. As can be seen in the Table, compared with the graft copolymer of Example 1 this polymer blend was very much lower in elongation at break and lower in tensile strength too.

EXAMPLE 2

For graft polymerization of CTFE with the rubber-like VDF/CTFE/BPAC copolymer prepared in Example 1, the graft polymerization reaction in Example 1 was modified by using 82.2 g of CTFE monomer in place of the combination of CTFE and ethylene. No change was made in other points. As the result 127 g of a graft copolymer in the form of white powder was obtained. By DSC analysis the melting temperature of this copolymer was 213° C. The copolymer was kneaded (at 200° C.) by the same method as in Example 1 and then press-shaped (at 240° C.) into a 1-mm thick sheet. The obtained sheet assumed a milky white color and was flexible. The copolymer in the sheet form was subjected to the tests described hereinbefore.

COMPARATIVE EXAMPLE 3

The graft polymerization process of Comparative Example 1 was modified by using 81.3 g of CTFE monomer alone in place of the combination of CTFE and ethylene. No change was made in other points. That is, the graft polymerization reaction was carried out in R-113 without using any reducing agent. As the result 109 g of a graft copolymer in the form of a white powder was obtained. By DSC analysis the melting temperature of this copolymer was 197° C. This was considerably lower than the melting temperature (223° C.) of the graft copolymer of Example 2, and in this case the exothermic peak was very much broader than that in Example 2. This copolymer was kneaded (at 190° C.) by the same method as in Example 1 and press-shaped (at 220° C.) into a 1-mm thick sheet, and the copolymer in the sheet form was subjected to the above described tests. As can by seen in the Table, compared with the graft copolymer of Example 2 this copolymer was very much lower in tensile strength and elongation at break and was lower in shear modulus too.

| | Melting Temp. (°C.) | Tensile Strength at break (kgf/cm$^2$) | Elongation at break (%) | Shear Modulus (dyn/cm$^2$) | Shore D Hardness |
|---|---|---|---|---|---|
| Ex. 1 | 230 | 226 | 317 | $2.0 \times 10^9$ (0° C.)<br>$1.2 \times 10^9$ (30° C.)<br>$7.0 \times 10^8$ (60° C.) | 50 |
| Comp. Ex. 1 | 175 | 93 | 207 | $1.5 \times 10^9$ (0° C.)<br>$5.0 \times 10^8$ (30° C.)<br>$1.8 \times 10^8$ (60° C.) | 43 |
| Comp. Ex. 2 | 240 | 191 | 97 | $1.8 \times 10^9$ (0° C.)<br>$1.6 \times 10^9$ (30° C.)<br>$9.0 \times 10^8$ (60° C.) | 54 |
| Ex. 2 | 213 | 187 | 308 | $1.6 \times 10^9$ (0° C.)<br>$1.1 \times 10^9$ (30° C.)<br>$6.0 \times 10^8$ (60° C.) | 53 |
| Comp. Ex. 3 | 197 | 104 | 238 | $1.4 \times 10^9$ (0° C.)<br>$9.0 \times 10^8$ (30° C.)<br>$5.0 \times 10^8$ (60° C.) | 51 |

-continued

| | Melting Temp. (°C.) | Tensile Strength at break (kgf/cm$^2$) | Elongation at break (%) | Shear Modulus (dyn/cm$^2$) | Shore D Hardness |
|---|---|---|---|---|---|
| Ex. 3 | 232 | 229 | 276 | $2.0 \times 10^9$ (0° C.)<br>$1.3 \times 10^9$ (30° C.)<br>$5.5 \times 10^8$ (60° C.) | 51 |
| Ex. 4 | 217 | 146 | 362 | $1.1 \times 10^9$ (0° C.)<br>$3.8 \times 10^8$ (30° C.)<br>$1.2 \times 10^8$ (60° C.) | 38 |

EXAMPLE 3

First 96 g of the rubber-like VDF/CTFE/BPAC copolymer prepared in Example 1 was dispersed in a solution of 2.4 g of ammonium perfluorooctanoate in 500 ml of purified water. Using this dispersion the graft polymerization reaction of Example 1 was repeated with modifications only in the following points. In this case the reducing weight was a combination of 0.96 g of $NaHSO_3$ and 0.33 g of $FeCl_3.6H_2O$. The quantity of CTFE monomer was increased to 124 g and the quantity of ethylene monomer to 30 g. As the result 208 g of a graft copolymer in the form of a white powder was obtained. By DSC analysis the melting temperature of this copolymer was 232° C. The copolymer was kneaded (at 220° C.) by the same method as in Example 1 and then press-shaped (at 250° C.) into a 1-mm thick sheet. The obtained sheet assumed a milky white color and was flexible. The copolymer in the sheet form was subjected to the tests described hereinbefore.

EXAMPLE 4

Initially a 2-liter stainless steel autoclave was charged with 1000 g of purified water, 3 g of potassium persulfate, 1 g of ammonium perfluorooctanoate and 2 g of BPAC. In this case BPAC was diluted, in advance, to 5 wt % with R-113. After repeatedly purging the gas atmosphere and replacing it by nitrogen gas, 169 g of VDF monomer and 133 g of CTFE monomer were charged into the autoclave, and the resultant mixture was subjected to copolymerization reaction at 50° C. for 20 hr with continuous stirring. The reaction product was in the state of a white latex, which weighed 1262 g. The solid concentration of this latex was measured to be 21.1 wt %, which means existence of 270 g of a rubber-like copolymer in the latex.

The VDF/CTFE/BPAC copolymer was recovered from a sampled portion of the latex and was washed and dried to obtain a white powder. Thermal analysis of the copolymer powder with DSC revealed existence of an exothermic peak at 160°-180° C. attributed to decomposition of peroxy group. By DSC analysis at lower temperatures, $T_g$ of the copolymer was determined to be −15° C. By iodometry the content of active oxygen in the copolymer was measured to be 0.04%. By elementary analysis, the VDF/CTFE ratio in the copolymer was determined to be 30.8/69.2 by mol.

Next, 474 g of the above latex (100 g in the quantity of the copolymer) was charged into a 1-liter autoclave provided with electromagnetic stirrer, and purified water was added to adjust the volume of the resultant mixture to 500 ml. Then, purging of the gas atmosphere and replacing it by nitrogen gas were repeated three times. After that 79.1 g of CTFE monomer and 19.8 g of ethylene monomer were introduced into the autoclave, followed by addition of 0.9 g of $NaHSO_3$ in the form of aqueous solution, and the resultant mixture was subjected to graft copolymerization reaction at 30° C. for 8 hr with continuous stirring. After purging unreacted portions of the monomers, a graft copolymer formed by the reaction was taken out of the autoclave. The copolymer had precipitated from the aqueous phase of the initial latex so that there was no need for any separation treatment such as salting-out. The copolymer was separated from the aqueous phase and was washed and dried under reduced pressure. As the result 164.8 g of a white powder was obtained. By DSC analysis the melting temperature of this copolymer was 217° C.

The graft copolymer obtained by the above process was kneaded with a pair of 4-inch rolls at 200° C. and then press-shaped at 250° C. into a 1-mm thick sheet. The sheet assumed a milky white color and was flexible. The copolymer in the sheet form was subjected to the tests described hereinbefore.

What is claimed is:

1. A method of producing a fluorine-containing graft copolymer, comprising the steps of:

providing an aqueous dispersion of a fluorine-containing elastomeric copolymer, said fluorine-containing elastomeric copolymer comprising peroxy groups and having a glass transition temperature lower than room temperature; and polymerizing at least one monomer, which is capable of providing a crystalline polymer and which comprises at least one fluorine-containing monomer, in said aqueous dispersion in the presence of at least one reducing agent at a temperature in the range from 20° to 50° C.

2. A method according to claim 1, wherein said at least one reducing agent comprises an inorganic compound selected from the group consisting of alkali metal sulfites, alkali metal bisulfites and alkali metal thiosulfates.

3. A method according to claim 2, wherein said at least one reducing agent further comprises another metal salt which provides a metal ion active as a reducing agent.

4. A method according to claim 3, wherein said another metal salt is selected from the group consisting of ferric halides, cobalt halides and copper halides.

5. A method according to claim 1, wherein said aqueous dispersion is a latex-like aqueous dispersion of said fluorine-containing elastomeric copolymer obtained as the product of a polymerization reaction to form said fluorine-containing elastomeric copolymer in water.

6. A method according to claim 1, wherein said elastomeric copolymer comprises 0.02–0.2 wt % of peroxy groups.

7. A method according to claim 1, wherein said elastomeric copolymer is selected from the group consisting of copolymers of vinylidene fluoride, chlorotrifluoroethylene and an organic peroxide, copolymers of vinylidene fluoride, hexafluoropropylene and an organic peroxide, copolymers of vinylidene fluoride, hexafluoropropylene, tetrafluoroethylene and an organic peroxide, copolymers of tetrafluoroethylene, propylene and an organic peroxide and copolymers of tetrafluoroethylene, perfluorovinyl ether and an organic peroxide.

8. A method according to claim 7, wherein said organic peroxide is t-butyl peroxyallylcarbonate.

9. A method according to claim 1, wherein said at least one fluorine-containing monomer is selected from the group consisting of tetrafluoroethylene, chlorotrifluoroethylene, vinylidene fluoride and vinyl fluoride.

10. A method according to claim 1, wherein said at least one monomer is a combination selected from the group consisting of a combination of chlorotrifluoroethylene and ethylene, a combination of tetrafluoroethylene and ethylene and a combination of tetrafluoroethylene and perfluorovinyl ether.

11. A method according to claim 1, wherein the quantity of said at least one monomer is controlled such that in the obtained graft copolymer the weight ratio of the elastomeric copolymer to the grafted crystalline polymer is in the range from 50:50 to 90:10.

* * * * *